April 22, 1930.  R. E. JORDAN  1,755,992
MEAT CURING METHOD
Filed May 13, 1927  4 Sheets-Sheet 3

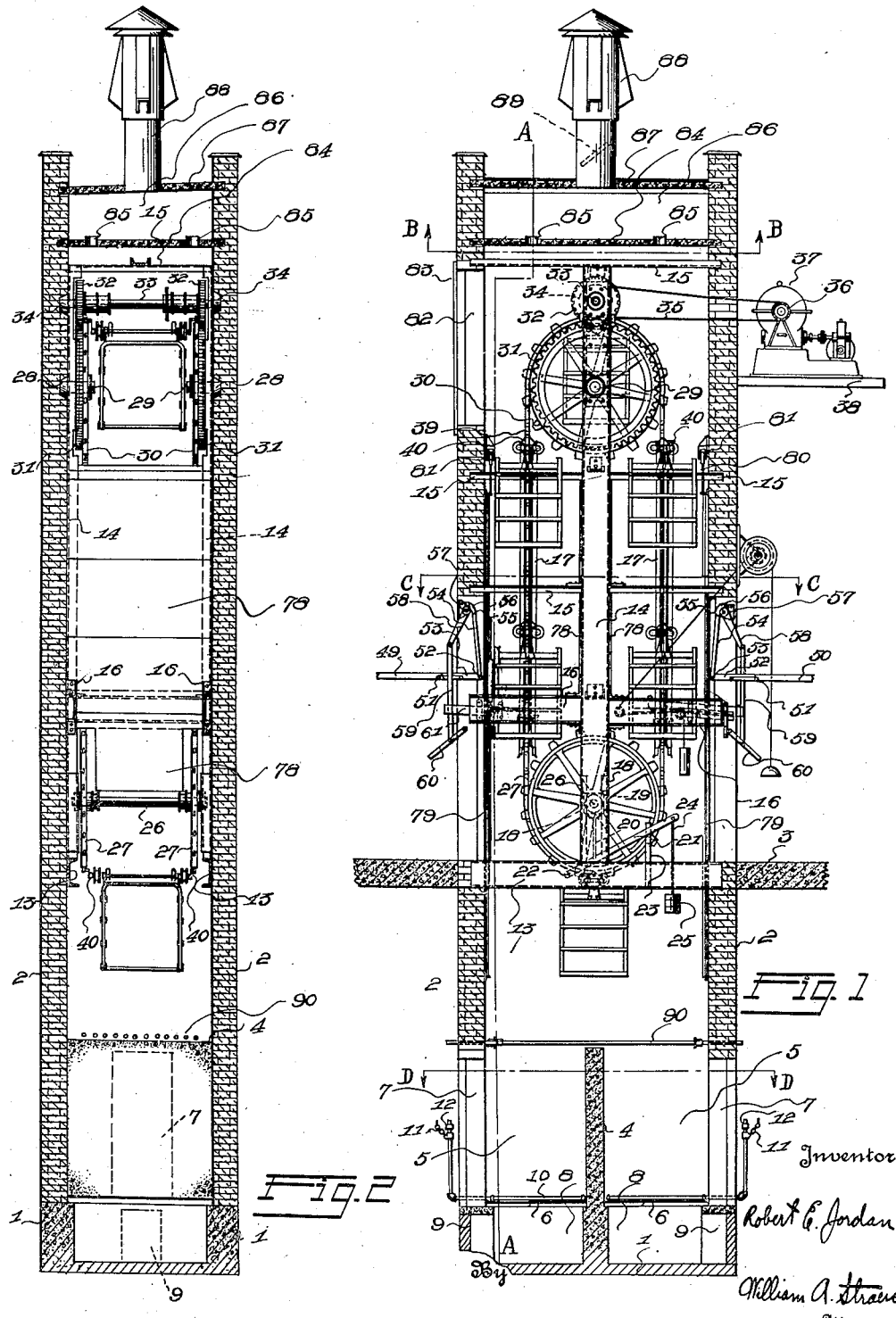

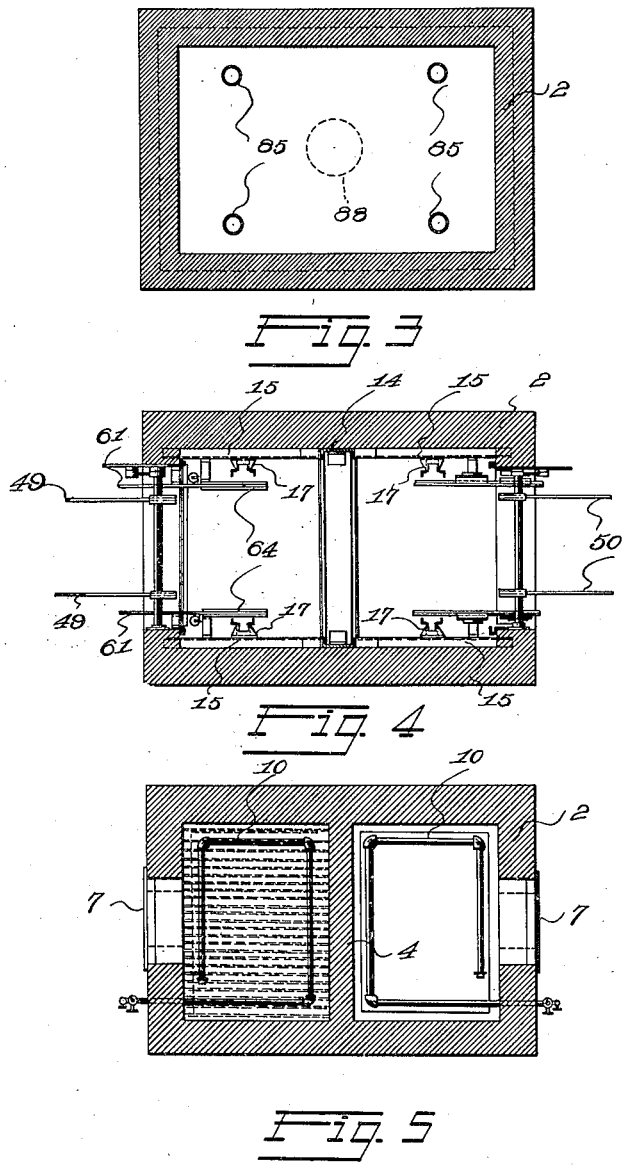

Inventor
Robert E. Jordan
By William A. Strauch
Attorney

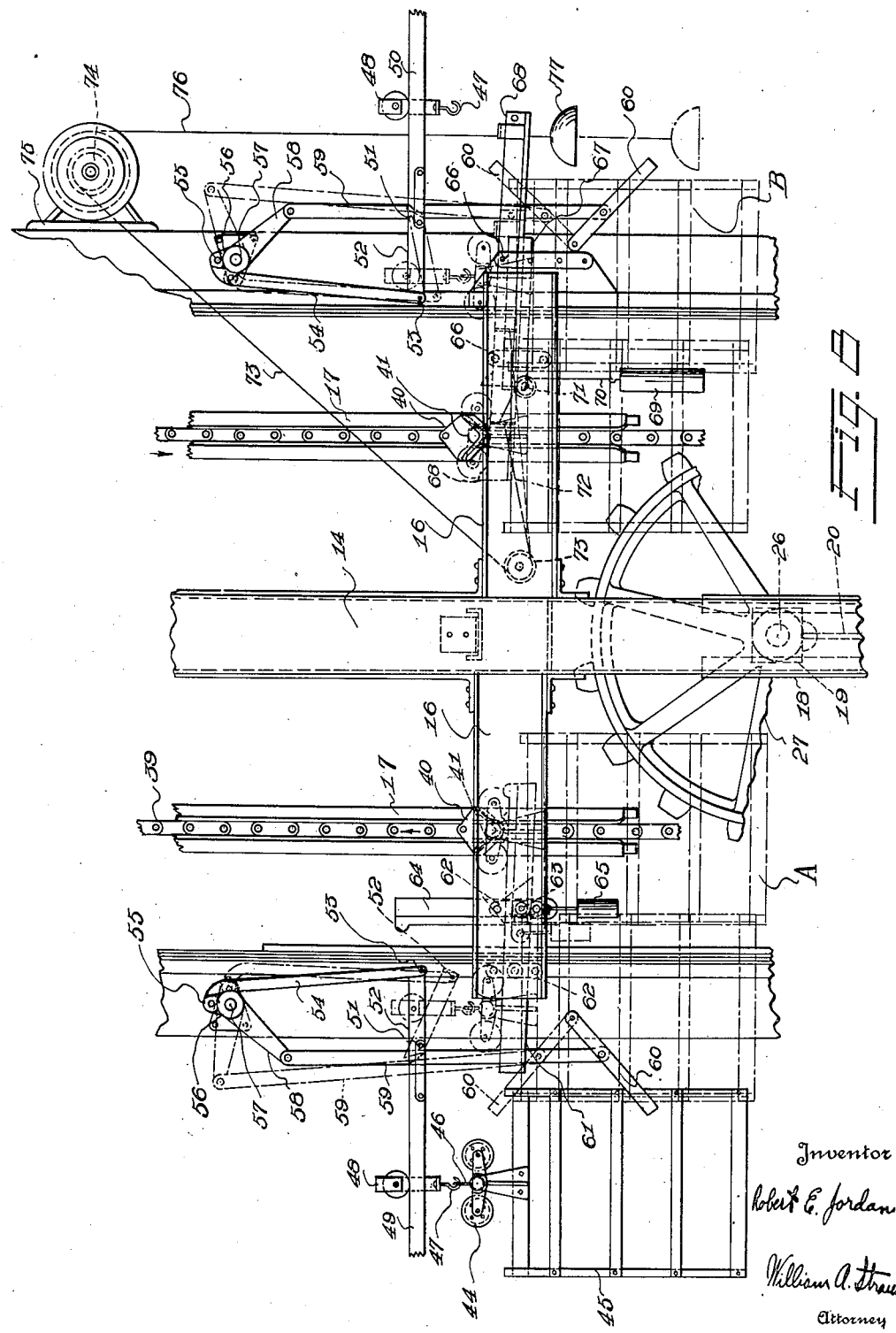

Patented Apr. 22, 1930

1,755,992

UNITED STATES PATENT OFFICE

ROBERT E. JORDAN, OF BALTIMORE, MARYLAND, ASSIGNOR TO THE ALLBRIGHT-NELL COMPANY, OF CHICAGO, ILLINOIS, A CORPORATION OF ILLINOIS

MEAT-CURING METHOD

Application filed May 13, 1927. Serial No. 191,104.

The present invention relates to smoking, curing, and drying processes and apparatus and more particularly relates to improved processes and apparatus for efficiently drying, smoking and curing products such as Frankforts, sausage, minced ham, bacon, ham, and the like.

It has heretofore been the practice to smoke and cure meat products in curing chambers through which the passage of large volumes of gases tend to pass in hot streams or currents through restricted areas of the curing chamber when the control dampers are opened substantially. This results in the development of zones of excessive temperatures and gas pockets of widely varying conditions within the chamber. In an effort to establish more uniform conditions it has been the practice to reduce the volume of gases so that the moisture is eliminated slowly from the curing chamber and the relative humidity within the chamber is high. This necessitates prolonged treatment in order to remove the moisture from the products being cured to the point where the gases can penetrate into the pores and can become effective to properly sterilize and condition the products and to impart thereto the desired keeping qualities, flavor, and color of a high grade product. Because of the relatively slow movement of the gases through the curing chamber in prior curing methods, gas pockets or spots are formed which vary widely in temperature and the articles are subjected to irregular conditions.

In the prior usual smoke-houses of the type in which articles are suspended on conveyors in vertical curing chambers, the articles in the hotter portions of the chamber are subjected to excessive temperatures resulting in the coagulation of the albumen, contracting of the outer pores, and the formation of an outer crust which tends to prevent proper and rapid removal of moisture from, and penetration of the smoking and curing gases into the interior of the product, while the articles in the cooler portions of the curing chamber are subjected to relatively low temperature and gases of relatively high humidity, so that the removal of moisture therefrom is slow. Because of improper distribution of gases and failure to eliminate the moisture evolved from this product with sufficient rapidity an excessive length of time is required to effect the curing of the articles. The failure to eliminate the moisture rapidly results in deterioration of the product, and bacterial growth tends to form which must be destroyed by the antiseptic properties of the curing gases to impart keeping qualities to the articles. As a result, the shrinkage in weight of products being cured by the prior processes is ordinarily from ten to fourteen per cent, and the articles in a single batch will vary widely in quality, color and degree of cure depending upon the particular condition in the curing chamber to which they have been subjected. In the prior types of vertical smoke-houses, even under the most favorable conditions, the spacing of the stations or carriers on the conveyors must be at least 42 inches or more. Even with this spacing the time of treatment is excessive, Frankforts and like smaller objects requiring from six to twelve hours or more to effect a cure, while bacon, minced ham, and like heavier articles require from twelve to twenty-four or more hours of treatment.

Because of the unevenness of cure in the smokehouses in which the articles remain stationary in the curing chamber during the smoking thereof and because of the variations in quality of such products, it has been proposed to cure articles in relatively small chambers provided with vertical shafts and laterally extending arms from which the articles to be cured are hung in an effort to secure a uniform product. In apparatus of this type, however, the proper distribution of gases and rapid elimination of moisture from the curing chamber has not been secured with the result that the articles are passed alternately through hot and cold spots. In the hot spots they are subjected to relatively high temperatures that coagulate the albumen, cause contraction of the outer pores, tending to form a crust relatively impervious to moisture and the curing gases, and the moisture content of the atmosphere is so high that the time of cure is not substantially reduced over that required in the stationary type of houses, and a shrinkage of ten to fourteen per cent in weight of the product has also been found necessary to impart keeping qualities to products. This type of smoke house has not improved the product or processes of curing to any substantial extent and has not been sufficiently successful to replace the vertical type of smokehouses on the market.

I have discovered that by proper control of the distribution, temperatures, and velocity of the gases, and by maintaining a continuous movement of the articles to be cured in a vertical smokehouse, it is possible to utilize stations spaced at approximately 15 inches or less on the conveyor and to crowd the meat together so that the products at the different stations may touch each other and the time of treatment may be considerably reduced while uniformly cured and high grade articles of improved quality are produced. By practicing my invention, the time of treatment of Frankforts and like small objects is reduced to form one-half to three hours, while the time of treatment of bacons, minced hams, and the like is reduced to approximately six to eight hours, according to the weight thereof and a product that will keep is secured with a shrinkage in weight of less than 10 percent and as low as from 4½ to 7 percent. In this way a substantial reduction in shrinkage of meat products and increase in capacity in apparatus of this type is attained, and at the same time uniformly cured and colored products of substantially higher quality are secured.

I accomplish my improved results in one form of my invention by providing a vertical smokehouse with a central dividing structure that cuts out substantially all of the central dead space and substantially divides the curing chamber into two vertical paths of movement in which the articles being cured are continuously moved by providing spaced gas outlets in the ceiling of the curing chamber so that the gases are compelled to rise in substantially uniform manner throughout the separate vertical paths of movement of the articles under treatment. The velocities and temperatures of the gases are controlled so that the coagulation of the albumens and rapid formation of a crust around the articles relatively impervious to moisture and gases is avoided. The continuous movement of the articles agitates the atmosphere and aids in maintaining substantially uniform temperature conditions in the paths of movement of the products through the curing chamber and a substantial increase in the velocity of contact with large warm volumes of relatively moderately heated gases with the products over that heretofore utilized may be secured, removing moisture to the desired degree from the pores of the product without causing contraction of the pores, in this way conditioning the product for rapid penetration of the curing gases. In this way the relative volume of moderately heated gases with which the products are contacted in a given period of time is substantially increased over the volume of higher temperature gases with which the articles have been heretofore contacted in vertical smoke-houses of prior art, and the articles are subjected to more uniform and more moderate temperature conditions than has heretofore been the practice.

In the handling of relatively heavy articles requiring a long time of cure and relatively deep penetration of the curing gases, I prefer to subject the product to an initial drying stage without the generation of the smoking or curing gases during which the products are contacted with air heated to a temperature of from 130 to 160 degrees Fahrenheit at which temperatures I have discovered that the moisture is removed rapidly from the pores to a sufficient degree to permit the rapid penetration of the smoking and curing gases into the product without causing substantial contraction or sealing of the outer pores. In the treatment of minced hams, bacon, and the like, this initial period of drying is maintained preferably from two to two and one-half hours. Smoke is then generated and contacted with such products for a period of approximately four to six hours, while the temperature of the gas is gradually reduced from 130 to 160 degrees Fahrenheit to 100 to 110 degrees Fahrenheit.

In the treatment of smaller articles such as Frankforts, sausage, and the like, in accordance with my improved processes, while an initial drying stage may be applied if desired, the time required for this drying is so short that the saving effected in this manner is generally not sufficient to warrant the division of the treatment into two stages. The character of these products also differs from the character of meat products such as minced hams, hams, bacon, and the like, and a satisfactory product may be secured by subjecting them to temperatures ranging from 130 to 160 degrees Fahrenheit throughout the entire operation while smoke may be generated from the beginning. Sausage treated in accordance with my improved process has imparted thereto a desirable bright color and improved flavor.

Accordingly, an object of the present invention is to provide improved processes for curing articles such as sausage, bacon, hams, and the like, in which proper conditions for rapidly and efficiently drying and imparting a uniform cure and suitable color thereto are provided.

Another object of the invention is to provide novel processes and apparatus for the smoking and curing of meats utilizing vertical conveyors in which the meat products may be crowded on the conveyors so that the products at the given stations substantially touch each other, while at the same time the velocity, temperatures, and distribution of the gases is such that substantial reductions in the time of treatment to effect the uniform cure are attained, and at the same time considerably improved products are secured.

A further object of the invention is to provide improved curing, smoking or drying arrangements in which simplified, novel and more efficient loading and unloading mechanisms for the transfer of articles to be treated to and from the treating chamber are provided and to provide improved curing, smoking and drying apparatus in which, if desired, the loading and unloading together with the treatment of the articles may be loaded into the conveyor continuously at one point and the completely smoked or cured articles may be continuously removed at another point.

Further objects of the invention are such as may be attained by the utilization of the various combinations, subcombinations, and principles hereinafter more fully set forth, and as defined by the scope of the appended claims.

As shown in the drawings:

Figure 1 is a sectional side elevation through a preferred arrangement of apparatus for practicing the invention.

Figure 2 is a sectional view taken along line A—A of Figure 1.

Figures 3, 4 and 5 are sectional plan views taken along lines B—B, C—C and D—D of Figure 1, respectively.

Figure 8 is a fragmental detailed side view showing the loading and unloading mechanisms.

Figure 6:
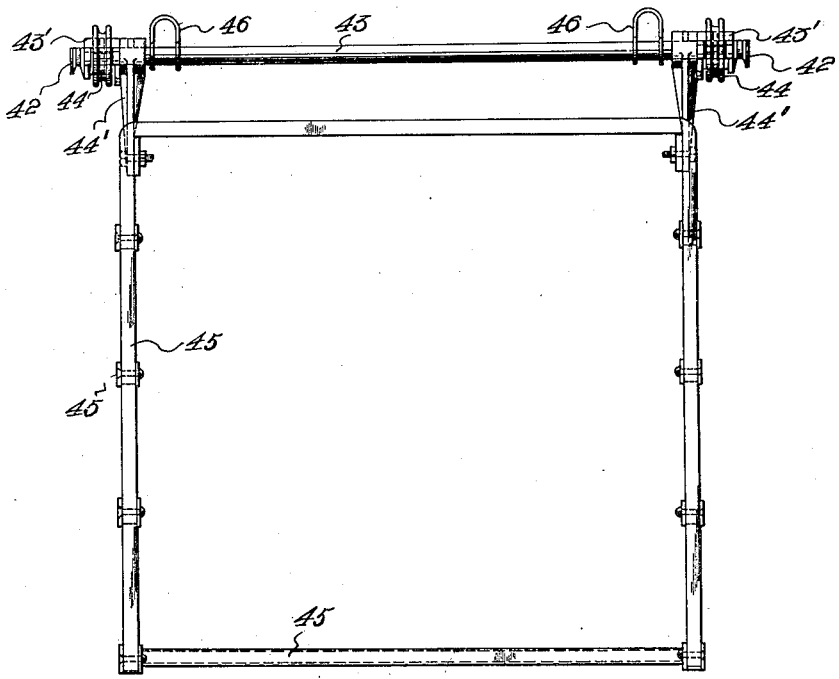
Figure 6 is a side elevation of a preferred form of carriage adapted for use with the form of apparatus shown in Figure 1.

Referring to Figures 1 to 5, foundation 1 of any suitable material, such as concrete, is provided upon which the side and end walls 2 of the smoke or treating house, which may be of brick or other suitable material, are built. The side walls 2 extend upward from the foundation 1 through a loading floor 3, and a dividing wall 4 below the loading floor 3 divides the lower part of the smoke house into two combustion or smoke or gas producing chambers 5. At the bottom of the chambers 5 the perforated plates or grates 6 are provided which rest on extensions of the foundation 1. Doors 7 in the side walls 2 of the chamber provide means for charging the chambers 5 with smoke or gas producing materials. Below the perforated plates or grate members 6 are formed the ash pits and air chambers 8 which are provided with suitable doors 9. Resting on the top of the grates 4 are the perforated pipes 10 forming gas burners for the ignition of saw dust or other smoke producing material. The burners 10 are connected by the air and gas lines 11 and 12 to suitable fuel gas and compressed air supply sources preferably controlled by valves from the loading floor 3.

Supported in the side walls 2 of the smoke house are channels 13 which have secured thereto and support the vertical channel shaped structural steel supporting members 14 which are also suitably anchored to the side walls 2. Channels 14 form central structural supports to which the inner ends of the angle iron members 15 and of the rail supporting channels 16 are secured. The members 15 and channels 16 are secured to the side walls and have their ends imbedded in the end walls 2 and in turn have secured thereto and support the chain guides 17.

Secured to the lower ends of channels 14 are the guide members 18 in which the journal boxes 19 (Figures 1 and 8) are slidably supported. Journal boxes 19 are connected by means of links 20 to the tension adjusting and compensating arms 21. Arms 21 are pivoted at 22 to beams 13 and are guided for movement by the members 23 which are supported from beams 13. Secured to the free ends of arms 21 by means of rods 24 are the tension adjusting weights 25.

Journaled in the bearings 19 is a sprocket shaft 26. Rigidly secured to the shaft 26 and rotatable therewith are the lower sprockets 27. In the upper part of the smoke or curing chamber, bearings 28 are secured to channels 14 and in the side walls 2 in any suitable manner. Bearings 28 rotatably support the sprocket supporting stub shafts 29 and supported on the stub shafts 29 are the upper sprockets 30 which have secured thereto and are driven by spur gears 31. Spur gears 31 are driven by pinions 32 mounted on shaft 33, which is suitably journaled in bearings 34. The shaft 33 is driven by means of a sprocket 34', chain 35, and the sprocket 36 from motor 37 which is suitably supported on a platform 38 above the level of the loading floor 3. Passing around the sprockets 29 and 30 are the endless chains 39 to which are secured at suitably spaced intervals the carriage supporting or carrying members 40 (Figures 1 and 8). The supporting members 40 are provided with the depressions or grooved sections 41 in which the lifting projections or members 42 of the smoking carriages are adapted to rest.

Figure 7:
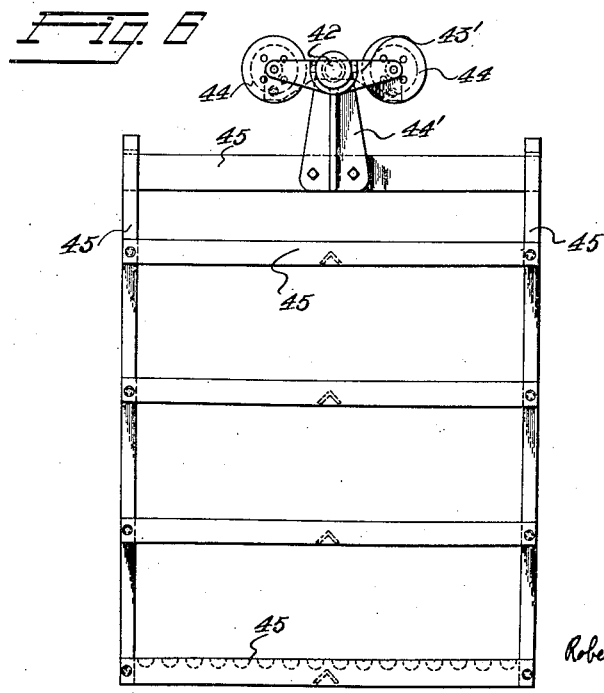
Figure 7 is an end view of the carriage shown in Figure 6.

As shown in Figures 6 and 7 the carriage lifting projections or members 42 are formed on the ends of the cross-rod 43 which is journaled in members 43' to the ends of which the grooved rollers 44 are rotatably secured. Rigidly secured to and depending from arms 44' are the carriage frame members 45 upon which the smoke sticks carrying the articles to be smoked, cured or dried are adapted to rest in well known manner. Secured to the rod 43 are the carriage supporting members or eyes 46 which are shaped to receive the hooks 47 (Figure 8) of the supporting trolley members 48. The supporting trolley members 48 are adapted to run on the overhead loading and unloading tracks 49 and 50 on which the carriages are adapted to be pushed or conveyed to suitable carriage loading and unloading points.

Pivoted to the ends of the loading and unloading tracks 49 and 50 (Figures 1 and 8) at points 51 are the track sections or extensions 52. The outer ends of the extensions 52 are pivotally connected at points 53 to the lower ends of links 54, and the upper ends of the links 54 are connected at points 55 to the operating arms 56. Operating arms 56 are secured to and rotatable with suitably supported actuating shafts 57 (Figures 1, 3 and 8) which in turn have secured thereto the actuating arms 58. The ends of arms 58 are pivotally secured to the upper ends of links 59, the lower ends of which are pivotally connected to operating levers 60 which are pivotally supported from the side walls 2 of the smoke house at their inner ends.

A pair of loading transfer members 61 (Figures 1 and 8) are secured to the frame members 16 and the wall of the smokehouse by means of the supporting brackets 62. Pivotally secured by pins 63 to members 61 are the track sections 64 which are normally held in vertical position by the counter-balancing weight members 65. The members 61 are disposed beneath the loading track extensions 52 as shown in Figure 8 and are so positioned with relation to the rollers or wheels 44 of a carriage suspended from a pair of trolleys 48 at the end of the track sections that as the track extensions 52 are lowered to the broken line position shown in Figure 8 by raising arm 60, the grooves in rollers 44 engage members 61 and the carriage supported from members 61 in such position that hooks 47 of trolleys 48 may be disengaged from eyes 47 of the carriage and may be returned to the loading point to be used for conveying another carriage along tracks 49. The carriage supported on members 61 moves by gravity or may be pushed inward and as the forward rollers 44 engage the pivoted extensions 64, the extensions 64 will be forced to the broken line position as shown and the carriage will move to the broken line position A. In this position of parts carriage extensions 42 will be positioned as shown in such relation to the chain carried lifting members 40 that as the chain 39 moves upward the grooves or recesses 41 of lifting members 41 will engage and pick up the carriage. As the carriage is lifted off extensions 64, counter-weights 65 will swing the extensions 64 to the full line position shown in Figure 8.

Supported adjacent the unloading opening of the smoke or curing chamber by means of the brackets 66 (Figure 8) are the guide members 67 in which the track sections 68 are slidably supported and guided. The unloading track sections 68 are normally held in the outer full line position shown in Figure 8 by means of counter-weights 69. Counter-weights 69 are connected to the inner ends of the sliding track sections 68 by means of the cords or cables 70 which in turn pass over the guiding and supporting pulleys 71 rotatably supported from the frame member 16. Secured to the inner ends of the track members 68 are the ends of cables 72 which pass over the pulleys 73 rotatably supported from the frame member 16. Cables 72 are wound on the drum 74, which in turn is rotatably supported by means of brackets 75 from the side of the smoke-house. Wound around a suitable section of the drum 74 is an actuating cable 76 which at its lower ends is secured to a weight 77. The slidable track sections 68 are mounted in alignment with the grooves of the pulleys 44 of carriages supported in the members 40 of the chains 39 and the parts are so balanced that the counter-weights 69 will normally hold the track sections 68 in the full line position shown in Figure 8 and out of the path of movement of carriages mounted on chains 39.

When it is desired to remove a carriage from the cage, the operator lowers the weight 77 to the broken line position. This will rotate the drum 74 and will wind cables 72 thereon, pulling track sections 68 inward into the path of movement of the rollers 44 of the carriages, as indicated by the broken line position of the members 68 in Figure 8. As the carriages move downward, the rollers 44 will engage the inner ends of the track sections 68 and the chain members 39 will move out of engagement with the carriage projections 42. When the members 40 and the projections 42 of the carriages are out of engagement the weight of the carriage will cause it to move to the right in Figure 8 to the broken line position indicated by "B." The operator may then raise the arm 60 upward to the broken line position, lowering the track section 52 and bringing the hooks 47 of the trolley 48 to a position where they may be hooked into the eyes 46 of the carriage. The arm 60 is then lowered to the full line position, raising the track sections 52 together with the trolleys 48 and carriage. This movement of the carriage will lift the rollers 44 clear of the track sections 68 and the track section 50 to a suitable unloading point.

A central dividing structure with a closed bottom is provided for the treatment chamber comprising the sheets or plates 78 (Figures 1 and 2) which are secured to frame channels 14. The plates 78 divide the treating chamber substantially into two sections and compel the smoke or gases to rise substantially only in the space in which the carriages are adapted to move. In this way economical distribution and utilization of the heated gases and smoke in the treating chamber is attained.

The loading and unloading openings of the smoke or treating house are provided with the closing doors 79 which are adapted to slide vertically in suitable guideways and are suspended from the supporting cables 80 which pass over the pulleys 81 and are suitably counter-balanced. Opening 82 at the top of the treating chamber is provided for convenient access to the mechanism and is closed by a suitable door 83.

The ceiling or top 84 for the treating chamber is provided with a plurality of smoke or gas ducts 85 preferably disposed substantially at the four corners of the ceiling and the smoke or gases pass from the upper part of the smoke chamber through the ducts 85 into a chamber 86 which is formed by the ceiling 84 and roof 87. It is to be noted that the arrangement of ducts 85 is such that gases ascend with substantially uniform velocity throughout the vertical paths of movement of the articles to be cured and this is an important feature of the invention. A ventilator or stack 88 through which the smoke or gases pass to atmosphere is provided in the roof 87 and a damper 89 is provided in the stack.

Located above the dividing wall 4 and below the loading floor 3 is a steam heating core 90 through which heating steam may be circulated.

In the preferred method of treating hams, bacon, minced ham, and like products, steam coils 90 are preferably utilized, the house is loaded, and the atmosphere in the curing chamber is heated approximately to 130 to 160 degrees Fahrenheit and maintained at this temperature for a period of approximately two and one-half hours, without generating smoke. Due to the construction of the smoke-house, the heated air currents will rise on opposite sides of the dividing sheets 78, passing through ducts 85 into compartment 86 and then out through stack 88, and chains 39 are continuously driven to circulate the articles through the chamber. In this period which may be termed the drying stage, a substantial portion of the moisture is removed from the articles and is carried out of the curing chamber without, however, causing substantial sealing or contraction of the pores so that the articles are conditioned for rapid penetration of the curing gases into the interior thereof. At the end of the drying stage the sawdust or other smoke producing material is ignited in the combustion chambers 5 and smoke is generated which passes upward through the curing chamber on opposite sides of each dividing structure and the temperature in the curing chamber is reduced gradually from 130 to 160 degrees Fahrenheit to 100 to 110 degrees Fahrenheit in approximately five hours time, during which time the articles are continuously circulated and subjected to the smoke. At the end of a total treatment of from six to eight or eight and one-half hours, the article such as bacon, ham and the like, according to their weight, will be thoroughly cured and will have a highly desirable bright color. The continuous circulation of the products and the arrangement of ducts 85 tends to maintain uniform conditions throughout the curing chamber, to prevent the formation of cold or excessively heated gases, and compels a substantially uniform distribution of rising heated gases.

In the preferred method of treating small articles such as sausage, Frankforts and the like, while an initial drying stage may be utilized, the character of these products and the curing thereof is so rapidly effected by my improved methods that this period is so short that no substantial advantage is gained by dividing the operation into two steps. Accordingly smoke may be generated immediately, and the temperature of the curing chamber is maintained at approximately 130 to 160 degrees Fahrenheit for a period ranging from approximately one-half to three hours, depending upon the product, during which time the chains 39 are driven at a uniform rate so that the product under treatment is circulated continuously through the treating chamber. By maintaining the continuous circulation of sausage in this type of apparatus at temperatures of 130 to 160 degrees Fahrenheit, I have discovered that uniformly smoked sausage with desirable color are produced in from one-half to three hours, without the necessity for maintaining different zones of temperatures or conditions in the smokehouse as disclosed in my copending application. By inspecting the articles as they pass by the unloading door, the operator can remove the carriages as the articles carried thereby reach the proper state of cure and color.

It will be noted that the smoke or gases from the chamber 5 pass upward on opposite sides of the dividing sheet in a substantially uniform current, are compelled to travel uniformly throughout the paths in which they will contact with the articles to be smoked and cannot pass through the central unused part of the smoking chamber. At the top of the treating chamber the smoke passes through ducts 85 in the ceiling of the smoking chamber into the space 86. In this way, it will be seen, economical distribution and utilization of the smoke is effected. By providing the space 86 at the top of the treating chamber condensation of moisture on the inner surface of the treating chamber ceiling is eliminated.

It will accordingly be seen that an improved smoking, curing or treating process and apparatus are provided in which simplified mechanical loading and unloading devices are utilized, and in which the cost and labor of handling of the articles to be treated is materially reduced. While a preferred embodiment of apparatus is disclosed the invention is not limited to the form shown and described and many variations thereof may be made by those skilled in the art without departing from the spirit of my invention. Accordingly, what is desired to be secured by Letters Patent and is claimed as new is:

1. The process of curing of minced ham, ham, bacon, and the like which comprises contacting the articles to be cured with currents of air heated to approximately 130 to 160 degrees Fahrenheit for a period of from two to two and one-half hours, and thereafter treating the articles for a period of from four to six and one-half hours, with smoke beginning at temperatures of approximately 130 to 160 degrees Fahrenheit, and gradually reducing the temperatures to 100 to 110 degrees Fahrenheit.

2. A process for treating and curing ham and like meat products, comprising the steps of, first, subjecting the meat products to a current of warm air at a temperature approximately within the range of 130°–160° F. to remove any undesirable moisture without closing the outer pores or coagulating the albumen of the meat product; and secondly, causing smoke at a relatively low temperature in the neighborhood of 130°–100° F. to penetrate the unclosed pores for a length of time sufficient to impart the desired cure and flavor to the particular meat product; both of said steps being carried out while continuously moving the meat products and uniformly circulating the air and smoke respectively through said moving products.

3. In the process defined in claim 2, maintaining the articles which comprise the meat products in very close proximity to one another.

4. A process for treating and curing meat products comprising the steps of: first, subjecting the meat products to a current of warm air, at a temperature sufficiently high to remove undesirable moisture rapidly, and sufficiently low to prevent substantial closing of the outer pores or substantial coagulation of the albumens of the products; and thereafter causing smoke, at a temperature not sufficiently high to cause substantial closing of the outer pores or substantial coagulation of the albumens, to penetrate the unclosed pores of the products for a length of time sufficient to impart the desired degree of smoked flavor and cure; both of said steps being carried out while continuously moving the meat products being cured and substantially uniformly circulating the air and smoke respectively through said moving products.

In testimony whereof I affix my signature.

ROBERT E. JORDAN.